(12) United States Patent
Kanbe et al.

(10) Patent No.: US 8,663,805 B2
(45) Date of Patent: Mar. 4, 2014

(54) VEHICLE-MOUNTED HEAT-RESISTANT HOSE

(71) Applicant: Tokai Rubber Industries, Ltd., Komaki (JP)

(72) Inventors: Shinobu Kanbe, Komaki (JP); Yasushi Iwata, Komaki (JP)

(73) Assignee: Tokai Rubber Industries, Ltd., Komaki-shi, Aichi-ken (JP)

( * ) Notice: Subject to any disclaimer, the term of this patent is extended or adjusted under 35 U.S.C. 154(b) by 0 days.

(21) Appl. No.: 13/675,519

(22) Filed: Nov. 13, 2012

(65) Prior Publication Data

US 2013/0068336 A1 Mar. 21, 2013

Related U.S. Application Data

(63) Continuation of application No. PCT/JP2012/055684, filed on Mar. 6, 2012.

(30) Foreign Application Priority Data

Mar. 11, 2011 (JP) ................................. 2011-054151

(51) Int. Cl.
*B32B 27/00* (2006.01)
(52) U.S. Cl.
USPC ......... 428/421; 138/137; 428/35.7; 428/36.9; 428/36.91

(58) Field of Classification Search
USPC .............. 138/137; 428/35.7, 36.9, 36.91, 421
See application file for complete search history.

(56) References Cited

FOREIGN PATENT DOCUMENTS

| JP | 61-171981 A | 8/1986 |
|----|---|---|
| JP | 06-079828 A | 3/1994 |
| JP | 2004-017485 A | 1/2004 |
| JP | 2010-042669 A | 2/2010 |
| WO | 2008/139967 A1 | 11/2008 |

OTHER PUBLICATIONS

International Search Report of PCT/JP2012-055684, mailing date of Jun. 5, 2012.

*Primary Examiner* — Michael C Miggins
(74) *Attorney, Agent, or Firm* — Westerman, Hattori, Daniels & Adrian, LLP

(57) ABSTRACT

A heat-resistant hose for a vehicle available at a low cost and excellent in interlayer adhesiveness includes: an inner layer; and an outer layer directly formed on an outer peripheral surface of the inner layer, in which the inner layer comprises a fluorine-based rubber composition containing the following components (a) to (e): (a) a fluorine-based rubber; (b) a polyol-based vulcanizing agent; (c) an organic onium compound; (d) magnesium oxide; and (e) calcium hydroxide, and the outer layer comprises an acrylic rubber composition containing the following components (A) to (C): (A) an acrylic rubber; (B) a benzenediol; and (C) at least one of an imidazole compound and a diamine-based vulcanizing agent.

18 Claims, 1 Drawing Sheet

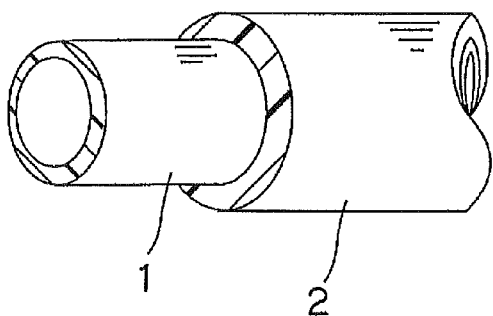

VEHICLE-MOUNTED HEAT-RESISTANT HOSE

RELATED APPLICATION

This application is a continuation of International Application No. PCT/JP2012/055684, filed on Mar. 6, 2012, which claims priority to Japanese Patent Application No. 2011-054151, filed on Mar. 11, 2011, the entire contents of each of which are hereby incorporated by reference.

BACKGROUND OF THE INVENTION

1. Field of the Invention

The present invention relates to a heat-resistant hose for a vehicle, which is used in fields such as automobilse and construction machines, and more specifically, to a heat-resistant hose for a vehicle such as a turbo air hose to be mounted on a turbocharger system.

2. Description of the Related Art

Widespread use of turbocharger systems on vehicles has been advanced to improve thermal efficiency of internal combustion engines and respond to emission control as part of an environmental response. Air introduced from the turbocharger into an intercooler or the engine has high temperature and high pressure, and hence a hose material for transporting the air is required to have high heat resistance.

In view of the foregoing, a hose using a fluororubber composition in its inner layer and an acrylic rubber composition in its outer layer has been proposed (see JP-A-2004-17485 and JP-A-2010-42669).

However, the hose described in each of JP-A-2004-17485 and JP-A-2010-42669 has the following problem. Since the inner layer and the outer layer are subjected to vulcanization adhesion to each other with a peroxide crosslinking agent blended into each of the fluororubber composition and the acrylic rubber composition, their interlayer adhesive force is insufficient and interfacial peeling occurs. It should be noted that an approach involving adhering the inner layer and the outer layer to each other with an adhesive has been proposed, but it involves the following problem, namely, steps of applying the adhesive, drying the adhesive, and the like are needed, and hence the unit price of the product increases.

SUMMARY OF THE INVENTION

The present invention has been made in view of such circumstances, and an object of the present invention is to provide a heat-resistant hose for a vehicle available at a low cost and having excellent interlayer adhesiveness.

In order to achieve the above-mentioned object, a heat-resistant hose for a vehicle of the present invention adopts the following construction. The heat-resistant hose for a vehicle includes: an inner layer; and an outer layer directly formed on an outer peripheral surface of the inner layer, in which the inner layer is formed by using a fluorine-based rubber composition containing the following components (a) to (e), and the outer layer is formed by using an acrylic rubber composition containing the following components (A) to (C):
(a) a fluorine-based rubber;
(b) a polyol-based vulcanizing agent;
(c) an organic onium compound;
(d) magnesium oxide;
(e) calcium hydroxide;
(A) an acrylic rubber;
(B) a benzenediol; and
(C) at least one of an imidazole compound and a diamine-based vulcanizing agent.

That is, the inventors of the present invention have made extensive studies to obtain a heat-resistant hose for a vehicle (hereinafter, sometimes simply referred to as "heat-resistant hose") available at a low cost and having excellent interlayer adhesiveness. In addition, in the process of continuous studies on a vulcanizing agent to replace the peroxide crosslinking agent that has been used heretofore, the inventors of the present invention have conceived of using a polyol vulcanizing agent as a vulcanizing agent for a fluorine-based rubber as a material for the inner layer of the heat-resistant hose, and at least one of an imidazole compound and a diamine-based vulcanizing agent as a vulcanizing agent for an acrylic rubber as a material for the outer layer of the hose. As a result of further continuous studies, the inventors of the present invention have found the following. When the inner layer of the heat-resistant hose is formed by using a fluorine-based rubber composition containing the polyol-based vulcanizing agent, an organic onium compound as a polyol-based vulcanization accelerator, and magnesium oxide and calcium hydroxide as acid-receiving agents, and the outer layer of the hose is formed by using an acrylic rubber composition containing a benzenediol such as resorcinol, and at least one of the imidazole compound and the diamine-based vulcanizing agent, the fluorine-based rubber of the inner layer and the acrylic rubber of the outer layer undergo co-crosslinking at the time of a vulcanization reaction, and hence interlayer adhesiveness between the inner layer and the outer layer improves without the use of any adhesive (i.e., in an adhesive-less manner). Thus, the inventors have reached the present invention.

As described above, the heat-resistant hose of the present invention is such that its inner layer is formed by using the fluorine-based rubber composition containing the fluorine-based rubber (component a), the polyol-based vulcanizing agent (component b), the organic onium compound (component c), magnesium oxide (component d), and calcium hydroxide (component e), and its outer layer is formed by using the acrylic rubber composition containing the acrylic rubber (component A), the benzenediol (component B), and at least one of the imidazole compound and the diamine-based vulcanizing agent (component C). As a result, the following effect is obtained. The fluorine-based rubber of the inner layer and the acrylic rubber of the outer layer undergo co-crosslinking at the time of a vulcanization reaction, and hence interlayer adhesiveness between the inner layer and the outer layer improves. In addition, the heat-resistant hose of the present invention has excellent dynamic durability because the interface of its fluorine-based rubber layer (inner layer) hardly deteriorates even after its heat aging.

In addition, when the content of the benzenediol (component B) is 0.5 to 5 parts by weight with respect to 100 parts by weight of the acrylic rubber (component A), a good balance between the interlayer adhesiveness and the heat resistance is established.

In addition, when the organic onium compound (component c) is at least one of a quaternary ammonium salt and a quaternary phosphonium salt, the vulcanization of the fluorine-based rubber (component a) by the polyol-based vulcanizing agent (component b) is further improved.

Further, when the imidazole compound as the component C is 1,2-dimethylimidazole, the diamine-based vulcanizing agent as the component C is 2,2-bis[4-(4-aminophenoxy)phenyl]propane, the vulcanization of the acrylic rubber (component A) is further improved.

In addition, when the outer layer is formed by using the acrylic rubber composition further containing a vulcanization accelerator (component D) in addition to the components A to C, and the vulcanization accelerator (component D) is at least one of a thiourea-based vulcanization accelerator and a guanidine-based vulcanization accelerator, the vulcanization of the acrylic rubber (component A) is further improved.

In addition, when the inner layer and the outer layer are subjected to direct vulcanization adhesion to each other, no adhesive needs to be used, and hence the step of applying an adhesive, the step of drying the adhesive, and the like are no longer needed. As a result, the unit price of the product can be reduced.

In addition, the incorporation of a benzenediol (such as resorcinol) into the fluorine-based rubber composition may cause the inhibition of the vulcanization of the fluorine-based rubber (component a) to deteriorate the interlayer adhesiveness. However, the use of the fluorine-based rubber composition free of a benzenediol eliminates the possibility that the inhibition of the vulcanization of the fluorine-based rubber (component a) occurs, and hence the interlayer adhesiveness is particularly improved.

It should be noted that the term "vehicle" with respect to the heat-resistant hose for a vehicle of the present invention is not limited to an automobile but also means, for example, a tractor, a tiller, a ship, an aircraft, or a digger or truck crane to be used in a construction machine.

BRIEF DESCRIPTION OF THE DRAWINGS

FIG. 1 is a perspective view schematically illustrating a heat-resistant hose of the present invention.

DETAILED DESCRIPTION OF THE INVENTION

Next, an embodiment of the present invention is described in detail, provided that the present invention is not limited to the embodiment.

As illustrated in FIG. 1, a heat-resistant hose of the present invention is constituted by, for example, subjecting an outer layer 2 to direct vulcanization adhesion to the outer peripheral surface of an inner layer 1 without using any adhesive (i.e., in an adhesive-less manner).

In the present invention, the inner layer 1 is formed by using a fluorine-based rubber composition containing the following components (a) to (e), and the outer layer 2 is formed by using an acrylic rubber composition containing the following components (A) to (C). This is the main feature of the present invention.
(a) A fluorine-based rubber
(b) A polyol-based vulcanizing agent
(c) An organic onium compound
(d) Magnesium oxide
(e) Calcium hydroxide
(A) An acrylic rubber
(B) A benzenediol
(C) At least one of an imidazole compound and a diamine-based vulcanizing agent Next, a material for forming each layer is described.

<<Fluorine-based Rubber Composition (Material for Inner Layer)>>

First, the fluorine-based rubber composition serving as a material for the inner layer of the heat-resistant hose of the present invention is described.

As described above, the fluorine-based rubber composition uses the fluorine-based rubber (component a), the polyol-based vulcanizing agent (component b), the organic onium compound (component c), magnesium oxide (component d), and calcium hydroxide (component e) as essential components.

<<Fluorine-based Rubber (Component a)>>

A fluorine-based rubber which can be subjected to polyol vulcanization is used as the fluorine-based rubber (component a). The fluorine-based rubber is, for example, a copolymer with one kind or two or more kinds of monomers such as vinylidene fluoride (VDF), trifluoroethylene, tetrafluoroethylene (TFE), hexafluoropropylene (HFP), pentafluoropropylene, vinylidene fluoride, perfluorovinylether, methylvinyl ether, and propyl vinyl ether. Of those, a fluorine-based rubber using vinylidene fluoride (VDF) as an essential component is preferred. Specific examples of the fluorine-based rubber (component a) include a vinylidene fluoride-hexafluoropropylene copolymer (VDF/HFP copolymer), a vinylidene fluoride-hexafluoropropylene-tetrafluoroethylene copolymer (VDF/HFP/TFE copolymer), and a vinylidene fluoride-tetrafluoroethylene-perfluoroalkyl vinyl ether copolymer. Of those, in terms of interlayer adhesiveness, a VDF/HFP copolymer and a VDF/HFP/TFE copolymer are preferred.

The fluorine content of the fluorine-based rubber (component a) is preferably 66 wt % or more, particularly preferably 69 wt % or more in terms of the property by which an interface deteriorates after heat aging, provided that an upper limit for the fluorine content is preferably 71 wt % or less because when the fluorine content is excessively large, the interlayer adhesiveness tends to deteriorate.

<<Polyol-based Vulcanizing Agent (Component b)>>

Examples of the polyol-based vulcanizing agent (component b) include 2,2-bis(4-hydroxyphenyl)perfluoropropane (hereinafter, referred to as bisphenol AF) and 2,2-bis(4-hydroxyphenyl)propane (hereinafter, referred to as bisphenol A). One kind of those agents is used alone, or two or more kinds thereof are used in combination.

The content of the polyol-based vulcanizing agent (component b) is preferably 0.5 to 5 parts by weight, particularly preferably 1 to 3 parts by weight with respect to 100 parts by weight of the fluorine-based rubber (component a). When the content of the polyol-based vulcanizing agent (component b) is excessively small, the vulcanization of the rubber tends to become insufficient and hence the interlayer adhesiveness tends to deteriorate. When the content of the polyol-based vulcanizing agent (component b) is excessively large, co-crosslinking tends to become insufficient and hence the interlayer adhesiveness tends to deteriorate.

<<Organic Onium Compound (Component c)>>

Examples of the organic onium compound (component c) include organic onium compounds such as a quaternary ammonium salt and a quaternary phosphonium salt. One kind of those compounds is used alone, or two or more kinds thereof are used in combination. Of those, a quaternary ammonium salt is preferred.

Examples of the quaternary ammonium salt include 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium-methylsulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride, 8-benzyl-1,8-diazabicyclo[5.4.0]-7-undecenium hydroxide, 8-phenethyl-1,8-diazabicyclo[5.4.0]-7- undecenium chloride, and 8-(3-phenylpropyl)-1,8-diazabicyclo[5.4.0]-7-undecenium chloride. One kind of those salts is used alone, or two or more kinds thereof are used in combination.

In addition, examples of the quaternary phosphonium salt include tetrabutylphosphonium chloride, benzyltriphenylphosphonium chloride, benzyltrimethylphosphonium chloride, and benzyltributylphosphonium chloride. One kind of those salts is used alone, or two or more kinds thereof are used in combination.

The content of the organic onium compound (component c) is preferably 0.2 to 4 parts by weight, particularly preferably 0.3 to 2 parts by weight with respect to 100 parts by weight of the fluorine-based rubber (component a). When the content of the organic onium compound (component c) is excessively small, such a tendency that the vulcanization becomes insufficient and hence the interlayer adhesiveness deteriorates is observed. When the content of the organic onium compound (component c) is excessively large, such a tendency that scorching occurs is observed.

<<Magnesium Oxide (Component d)>>

The content of the magnesium oxide (component d) is preferably 0.5 to 15 parts by weight, particularly preferably 1 to 10 parts by weight with respect to 100 parts by weight of the fluorine-based rubber (component a). When the content of the magnesium oxide (component d) is excessively small, the vulcanization tends to become insufficient and hence the interlayer adhesiveness tends to deteriorate. When the content of the magnesium oxide (component d) is excessively large, scorching tends to occur.

<<Calcium Hydroxide (Component e)>>

The content of the calcium hydroxide (component e) is preferably 1 to 15 parts by weight, particularly preferably 2 to 10 parts by weight with respect to 100 parts by weight of the fluorine-based rubber (component a). When the content of the calcium hydroxide (component e) is excessively small, the vulcanization tends to become insufficient and hence the interlayer adhesiveness tends to deteriorate. When the content of the calcium hydroxide (component e) is excessively large, scorching tends to occur.

The fluorine-based rubber composition to be used in the present invention may be blended with carbon black, a processing aid, an age resistor, or the like in addition to the fluorine-based rubber (component a), the polyol-based vulcanizing agent (component b), the organic onium compound (component c), magnesium oxide (component d), and calcium hydroxide (component e) as required. One kind of those materials is used alone, or two or more kinds thereof are used in combination.

It should be noted that the fluorine-based rubber composition is preferably free of any benzenediol (resorcinol, catechol, or hydroquinone) in terms of interlayer adhesiveness.

<<Carbon Black>>

Examples of the carbon black include SAF-, ISAF-, HAF-, MAF-, FEF-, GPF-, SRF-, FT-, and MT-grade carbon blacks. One kind of those carbon blacks is used alone, or two or more kinds thereof are used in combination. Of those, SRF-grade carbon black is preferred.

The content of the carbon black is preferably 5 to 40 parts by weight, particularly preferably 10 to 20 parts by weight with respect to 100 parts by weight of the fluorine-based rubber (component a).

The fluorine-based rubber composition to be used in the present invention can be prepared by, for example, kneading the fluorine-based rubber (component a), the polyol-based vulcanizing agent (component b), the organic onium compound (component c), magnesium oxide (component d), and calcium hydroxide (component e), and the carbon black or the like to be appropriately blended into the materials as required with a kneading machine such as a kneader, a roll, or a Banbury mixer.

It should be noted that the fluorine-based rubber composition may be prepared by: mixing the fluorine-based rubber (component a), the polyol-based vulcanizing agent (component b), and the organic onium compound (component c) to produce an FKM (fluororubber) pre-compound in advance; adding magnesium oxide (component d), calcium hydroxide (component e), and the like to the pre-compound; and kneading the mixture in the same manner as in the foregoing.

<<Acrylic Rubber Composition>>

Next, the acrylic rubber composition serving as a material for the outer layer of the heat-resistant hose of the present invention is described.

As described above, the acrylic rubber composition uses the acrylic rubber (component A), the benzenediol (component B), and at least one of the imidazole compound and the diamine-based vulcanizing agent (component C) as essential components.

<<Acrylic Rubber (Component A)>>

The acrylic rubber (component A) is preferably a rubber that is vulcanized with the imidazole compound or the diamine-based vulcanizing agent, and examples thereof include rubbers each obtained by introducing, to one or two or more kinds of (meth)acrylic monomers as a main component, an ethylene monomer.

It should be noted that, in the present invention, the term "(meth)acrylic monomer" means an acrylic monomer or a methacrylic monomer.

Examples of the acrylic monomer include acrylates such as methyl acrylate, ethyl acrylate, propyl acrylate, n-butyl acrylate, n-octyl acrylate, methoxymethyl acrylate, methoxyethyl acrylate, and ethoxyethyl acrylate. In addition, examples of the methacrylic monomer include methacrylates corresponding to the acrylic monomers.

It should be noted that the acrylic rubber (component A) may be copolymerized with a crosslinkable group-containing monomer at a ratio of 5 wt % or less of the total amount of the rubber. The crosslinkable group-containing monomer is, for example, a monomer having an active halogen group, an epoxy group, a carboxyl group, a hydroxyl group, an amide group, a diene group, or the like. Of those, an epoxy group of glycidyl methacrylate or the like and a carboxyl group of monobutyl maleate or the like are preferred.

<<(Benzenediol (Component B)>>

Examples of the benzenediol (component B) include 1,3-benzenediol (resorcinol), 1,2-benzenediol (catechol), and 1,4-benzenediol (hydroquinone). One kind of these benzenediols is used alone, or two or more kinds thereof are used in combination.

The content of the benzenediol (component B) is preferably 0.5 to 5 parts by weight, particularly preferably 1 to 3 parts by weight with respect to 100 parts by weight of the acrylic rubber (component A). When the content of the benzenediol (component B) is excessively small, the interlayer adhesiveness tends to deteriorate. When the content of the benzenediol (component B) is excessively large, the interlayer adhesiveness tends to improve but heat deterioration resistance tends to deteriorate.

<<At Least One of Imidazole Compound and Diamine-based Vulcanizing Agent (Component C)>>

Examples of the imidazole compound include 1-methylimidazole, 1,2-dimethylimidazole, 1-benzyl-2-methylimidazole, and 1-cyanoethyl-2-methylimidazole. One kind of these compounds is used alone, or two or more kinds thereof are used in combination.

In addition, examples of the diamine-based vulcanizing agent include 2,2-bis[4-(4-aminophenoxy)phenyl]propane (hereinafter, sometimes referred to as BAPP), hexamethylenediamine carbamate, N,N'-dicinnamylidene-1,6-hexamethylenediamine, 4,4'-bis(aminocyclohexyl)methane carbamate, 4,4'-diaminodiphenyl ether (hereinafter, sometimes referred to as DPE), p-phenylenediamine, m-phenylenediamine, 2,5-dimethyl-1,4-phenylenediamine, and N,N'-dimethyl-1,4-phenylenediamine. One kind of these agents is used alone, or two or more kinds thereof are used in combination.

The content of the specific vulcanizing agent (component C) is preferably 0.2 to 5 parts by weight, particularly preferably 1 to 3 parts by weight with respect to 100 parts by weight of the acrylic rubber (component A). When the content of the component C is excessively small, the vulcanization of the acrylic rubber (component A) tends to become insufficient. When the content of the component C is excessively large, scorching tends to occur.

The acrylic rubber composition to be used in the present invention may be blended with a vulcanization accelerator (component D), carbon black, a plasticizer, an age resistor, or the like in addition to the acrylic rubber (component A), the benzenediol (component B), and at least one of the imidazole compound and the diamine-based vulcanizing agent (component C) as required. One kind of these materials is used alone, or two or more kinds thereof are used in combination.

<<Vulcanization Accelerator (Component D)>>

The vulcanization accelerator (component D) is, for example, a thiourea-, thiazole-, sulfenamide-, thiuram-, aldehyde ammonia-, aldehyde amine-, or guanidine-based vulcanization accelerator. One kind of these accelerators is used alone, or two or more kinds thereof are used in combination. Of those, in terms of interlayer adhesiveness, a thiourea-based vulcanization accelerator and a guanidine-based vulcanization accelerator are preferred.

Examples of the thiourea-based vulcanization accelerator include N,N'-diphenylthiourea, N,N'-diethylthiourea, N,N'-dibutylthiourea, dibutylthiourea, dilaurylthiourea, trimethylthiourea, ethylene thiourea, 2-mercaptoimidazoline, and 2-imidazoline-2-thiol. One kind of these accelerators is used alone, or two or more kinds thereof are used in combination. Of those, in terms of interlayer adhesiveness, trimethylthiourea is preferred.

Examples of the guanidine-based vulcanization accelerator include diphenylguanidine, di-o-tolylguanidine, o-tolylbiguanidine, and di-o-tolylguanidine salt of dicatechol borate. One kind of these accelerators is used alone, or two or more kinds thereof are used in combination. Of those, in terms of interlayer adhesiveness, di-o-tolylguanidine is preferred.

The content of the vulcanization accelerator (component D) is preferably 0.1 to 10 parts by weight, particularly preferably 0.5 to 4 parts by weight with respect to 100 parts by weight of the acrylic rubber (component A). When the content of the vulcanization accelerator (component D) is excessively small, the interlayer adhesiveness tends to be hardly improved. When the content of the vulcanization accelerator (component D) is excessively large, scorching tends to occur.

<<Carbon Black>>

Examples of the carbon black include SAF-, ISAF-, HAF-, MAF-, FEF-, GPF-, SRF-, FT-, and MT-grade carbon blacks. One kind of these carbon blacks is used alone, or two or more kinds thereof are used in combination. Of those, MAF-grade carbon black is preferred.

The content of the carbon black is preferably 20 to 100 parts by weight, particularly preferably 40 to 80 parts by weight with respect to 100 parts by weight of the acrylic rubber (component A).

<<Age Resistor>>

Examples of the age resistor include carbamate-, phenylenediamine-, phenol-, diphenylamine-, and quinoline-based age resistors, and waxes. One kind of these age resistors is used alone, or two or more kinds thereof are used in combination.

The content of the age resistor is preferably 0.5 to 10 parts by weight, particularly preferably 1 to 4 parts by weight with respect to 100 parts by weight of the acrylic rubber (component A).

The acrylic rubber composition to be used in the present invention can be prepared by, for example, kneading the acrylic rubber (component A), the benzenediol (component B), and at least one of the imidazole compound and the diamine-based vulcanizing agent (component C), and the vulcanization accelerator (component D), the carbon black, or the like to be appropriately blended into the materials as required with a kneading machine such as a kneader, a roll, or a Banbury mixer.

Next, a method of producing the heat-resistant hose of the present invention is specifically described. That is, the fluorine-based rubber composition serving as a material for the inner layer and the acrylic rubber composition serving as a material for the outer layer are each prepared in accordance with the method described above. Then, the fluorine-based rubber composition (material for the inner layer) and the acrylic rubber composition (material for the outer layer) are co-extruded onto a mandrel and subjected to steam vulcanization by heating under predetermined conditions (e.g., 160° C.×30 minutes), followed by secondary vulcanization in an oven under predetermined conditions (e.g., 160° C.×4 hours). Thus, the outer layer 2 is directly formed on the outer peripheral surface of the inner layer 1, and hence the heat-resistant hose in which both the layers are strongly adhered to each other in an adhesive-less manner (see FIG. 1) can be obtained. It should be noted that the method of producing the heat-resistant hose of the present invention can also be practiced without using the mandrel.

The structure of the heat-resistant hose of the present invention is not limited to the one illustrated in FIG. 1 and, for example, an outermost layer for reinforcement formed of a rubber material may be further formed on the outer peripheral surface of the outer layer 2. It should be noted that a material for forming the outermost layer may be the same acrylic rubber composition as the material for the outer layer. In this case, the outer layer and the outermost layer can be subjected to direct vulcanization adhesion to each other in an adhesive-less manner. In addition, the heat-resistant hose of the present invention may be of a structure "the inner layer 1/the outer layer 2/a splicing yarn layer/the outermost layer," and the splicing yarn layer may be subjected to an adhesive treatment.

The heat-resistant hose of the present invention has a hose inner diameter of preferably 5 to 100 mm, particularly preferably 40 to 70 mm. In addition, the thickness of the inner layer 1 is preferably 0.2 to 2 mm, particularly preferably 0.3 to 1 mm, and the thickness of the outer layer 2 is preferably 0.5 to 5.0 mm, particularly preferably 1 to 3 mm.

EXAMPLES

Next, examples are described together with comparative examples, provided that the present invention is not limited to these examples.

First, the following materials were prepared prior to the examples and the comparative examples.

<<Preparation of Fluorine-based Rubber Compositions A to C (for Examples) and Fluorine-based Rubber Composition E (for Comparative Examples)>>

A fluorine-based rubber (component a), a polyol-based vulcanizing agent (component b), and an organic onium compound (component c) shown in Table 1 below were loaded into a kneader at ratios shown in the table, and were then kneaded to prepare an FKM pre-compound. Next, the other components were blended into the FKM pre-compound at ratios shown in the table, and then the materials were kneaded with a roll. Thus, a fluorine-based rubber composition was prepared.

TABLE 1

| | (Part(s) by weight) Fluorine-based rubber composition | | | |
|---|---|---|---|---|
| | A | B | C | E |
| Fluorine-based rubber (i) | 100 | — | — | — |
| Fluorine-based rubber (ii) | — | 100 | — | 100 |
| Fluorine-based rubber (iii) | — | — | 100 | — |
| Polyol-based vulcanizing agent | 2 | 2 | 2 | — |
| Peroxide crosslinking agent | — | — | — | 2 |
| Organic onium compound | 0.6 | 0.6 | 0.6 | — |

TABLE 1-continued

| | (Part(s) by weight) Fluorine-based rubber composition | | | |
|---|---|---|---|---|
| | A | B | C | E |
| Carbon black | 15 | 15 | 15 | 15 |
| Magnesium oxide | 3 | 3 | 3 | 3 |
| Calcium hydroxide | 6 | 6 | 6 | 6 |

(Fluorine-based rubber (i) (component a)) VDF/HFP copolymer (VDF/HFP = 60/40 in terms of weight ratio) (fluorine content: 66 wt %)
(Fluorine-based rubber (ii) (component a)) VDF/HFP/TFE copolymer (VDF/HFP/TFE = 41/37/22 in terms of weight ratio) (fluorine content: 69 wt %)
(Fluorine-based rubber (iii) (component a)) VDF/HFP/TFE copolymer (VDF/HFP/TFE = 33/46/21 in terms of weight ratio) (fluorine content: 71 wt %)
(Polyol-based vulcanizing agent (component b)) BisphenolAF (bisphenolAF manufactured by Tokyo Chemical Industry Co., Ltd.)
(Peroxide crosslinking agent (for comparative examples)) Dicumyl peroxide (PERCUMYL D-40 manufactured by Nippon Oils and Fats Co., Ltd.)
(Organic onium compound (component c)) 8-Benzyl-1,8-diazabicyclo[5.4.0]-7-undecenium chloride (DBU-B manufactured by Wako Pure Chemical Industries, Ltd.)
(Carbon black) SRF-grade carbon black (SEAST S manufactured by Tokai Carbon Co., Ltd.)
(Magnesium oxide (component d)) KYOWA MAG 150 manufactured by Kyowa Chemical Industry Co., Ltd.
(Calcium hydroxide (component e)) CALVIT manufactured by Ohmi Chemical Industry Co., LTD.

<<Preparation of Acrylic Rubber Compositions a to i (for Examples) and Acrylic Rubber Compositions j and k (for Comparative Examples)>>

Respective components shown in Table 2 below were blended at ratios shown in the table, and were then kneaded with a roll to prepare an acrylic rubber composition.

TABLE 2

| | (Part(s) by weight) Acrylic rubber composition | | | | | | | | | | |
|---|---|---|---|---|---|---|---|---|---|---|---|
| | a | b | c | d | e | f | g | h | i | j | k |
| Acrylic rubber | 100 | 100 | 100 | 100 | 100 | 100 | 100 | 100 | 100 | 100 | 100 |
| Stearic acid | 1 | 1 | 1 | 1 | 1 | 1 | 1 | 1 | 1 | 1 | 1 |
| Age resistor | 2 | 2 | 2 | 2 | 2 | 2 | 2 | 2 | 2 | 2 | 2 |
| Carbon black | 60 | 60 | 60 | 60 | 60 | 60 | 60 | 60 | 60 | 60 | 60 |
| Liquid paraffin | 2 | 2 | 2 | 2 | 2 | 2 | 2 | 2 | 2 | 2 | 2 |
| Plasticizer | 10 | 10 | 10 | 10 | 10 | 10 | 10 | 10 | 10 | 10 | 10 |
| Resorcinol | 0.5 | 1 | 2 | 5 | — | — | 2 | 2 | 2 | — | — |
| Catechol | — | — | — | — | 2 | — | — | — | — | — | — |
| Hydroquinone | — | — | — | — | — | 2 | — | — | — | — | — |
| Imidazole compound | 0.5 | 0.5 | 0.5 | 0.5 | 0.5 | 0.5 | — | 0.5 | 0.5 | 0.5 | — |
| BAPP | — | — | — | — | — | — | 1.5 | 1.0 | — | — | 1.5 |
| Thiourea compound | 0.5 | 0.5 | 0.5 | 0.5 | 0.5 | 0.5 | — | 0.5 | — | 0.5 | — |
| Guanidine-based vulcanization accelerator | — | — | — | — | — | — | 3 | 3 | — | — | 3 |
| Quaternary ammonium salt | 0.5 | 0.5 | 0.5 | 0.5 | 0.5 | 0.5 | — | 0.5 | 0.5 | 0.5 | — |

(Acrylic rubber (component A)) Copolymer rubber of ethyl acrylate, butyl acrylate, and glycidyl methacrylate (ethyl acrylate/butyl acrylate/glycidyl methacrylate = 59.5 wt %/40.0 wt %/0.5 wt %)
(Stearic acid) LUNAC S30 manufactured by Kao Corporation
(Amine-based age resistor) 4,4'($\alpha,\alpha$-Dimethylbenzyl)diphenylamine (NAUGARD 445 manufactured by Crompton Corporation)
(Carbon black) MAF-grade carbon black (SEAST 116 manufactured by Tokai Carbon Co., Ltd.)
(Liquid paraffin) CRYSTOL 70 manufactured by ESSO
(Plasticizer) ADK CIZER RS735 manufactured by ADEKA CORPORATION
(Resorcinol (1,3-benzenediol) (component B)) RESORCINOL manufactured by Sumitomo Chemical Co., Ltd.
(Catechol (1,2-benzenediol) (component B)) Catechol manufactured by UBE INDUSTRIES, LTD.
(Hydroquinone (1,4-benzenediol) (component B)) Hydroquinone manufactured by Seiko Chemical Co., Ltd.
(Imidazole compound (vulcanizing agent) (component C)) 1,2-Dimethylimidazole (SN-25 manufactured by SHIKOKU CHEMICALS CORPORATION)
(Diamine-based vulcanizing agent (component C)) 2,2-Bis[4-(4-aminophenoxy)phenyl]propane (BAPP manufactured by Wakayama Seika Kogyo Co., Ltd.)
(Thiourea compound (thiourea-based vulcanization accelerator) (component D)) Trimethylthiourea (NOCCELER TMU manufactured by OUCHI SHINKO CHEMICAL INDUSTRIAL CO., LTD.)
(Guanidine-based vulcanization accelerator (component D)) Di-o-tolylguanidine (NOCCELER DT manufactured by OUCHI SHINKO CHEMICAL INDUSTRIAL CO., LTD.)
(Quaternary ammonium salt) Tetraethylammonium bromide (Tetraethylammonium Bromide manufactured by Tokyo Chemical Industry Co., Ltd.)

Example 1

A heat-resistant hose using a combination of a fluorine-based rubber composition (material for an inner layer) and an acrylic rubber composition (material for an outer layer) shown in Table 3 below was produced. That is, the fluorine-based rubber composition (material for an inner layer) and the acrylic rubber composition (material for an outer layer) were co-extruded onto a mandrel and subjected to steam vulcanization by heating at 160° C. for 30 minutes, followed by secondary vulcanization in an oven at 160° C. for 4 hours. Thus, a heat-resistant hose (having an inner diameter of 30 mm and an outer diameter of 35 mm) in which an outer layer (having a thickness of 2 mm) was directly formed on the outer peripheral surface of an inner layer (having a thickness of 0.5 mm) was produced.

Examples 2 to 11 and Comparative Examples 1 to 4

Heat-resistant hoses were each produced in the same manner as in Example 1 except that the combination of the fluorine-based rubber composition (material for an inner layer) and the acrylic rubber composition (material for an outer layer) was changed to a combination shown in Table 3 below.

TABLE 3

| | Inner layer | Outer layer | Evaluation of adhesiveness | |
|---|---|---|---|---|
| | Fluorine-based rubber composition | Acrylic rubber composition | Peel strength (N/25 mm) | Interlayer adhesiveness |
| Example 1 | A | c | 105 | ⊚ |
| Example 2 | B | a | 56 | ○ |
| Example 3 | B | b | 73 | ⊚ |
| Example 4 | B | c | 89 | ⊚ |
| Example 5 | B | d | 96 | ⊚ |
| Example 6 | B | e | 58 | ○ |
| Example 7 | B | f | 60 | ○ |
| Example 8 | B | g | 90 | ⊚ |
| Example 9 | C | c | 60 | ○ |
| Example 10 | B | h | 100 | ⊚ |
| Example 11 | B | i | 61 | ○ |
| Comparative Example 1 | B | j | 10 | x |
| Comparative Example 2 | B | k | 28 | x |
| Comparative Example 3 | E | j | 5 | x |
| Comparative Example 4 | E | c | 15 | x |

Each of the heat-resistant hoses of the examples and comparative examples thus obtained was evaluated for its interlayer adhesiveness in accordance with the following criteria. Table 3 above shows the results.

(Adhesiveness (Peel Strength, Interlayer Adhesiveness))

A test piece having a thickness of 2.5 mm (thickness of the inner layer: 0.5 mm, thickness of the outer layer: 2 mm) and a width of 25 mm was cut out of each heat-resistant hose, and then the inner layer of the test piece was peeled with a tension tester (JIS B 7721) at a speed of 50 mm/min. A peel strength (N/25 mm) at the time of the peeling was measured and an evaluation of the interlayer adhesiveness was performed on the basis of the following criteria.

<Evaluation>
⊚: The entire surface of the peeled surface is in a state of rubber fracture.
○: The surface is partially in a state of rubber fracture.
x: The entire surface is in a state of interfacial peeling.

As can be seen from the results of Table 3, each of the products of the examples had a high peel strength and excellent interlayer adhesiveness.

In contrast, Comparative Example 1 had poor interlayer adhesiveness because the acrylic rubber composition j free of a benzenediol (resorcinol, catechol, or hydroquinone) was used.

Comparative Example 2 also had poor interlayer adhesiveness, similarly to Comparative Example 1, because the acrylic rubber composition k free of a benzenediol was used.

Comparative Example 3 had poor interlayer adhesiveness, similarly to Comparative Example 1, because the fluorine-based rubber composition E containing the peroxide crosslinking agent was used and the acrylic rubber composition j free of a benzenediol was used.

Comparative Example 4 had inferior interlayer adhesiveness, as compared to Example 4 in which the fluorine-based rubber composition B containing the polyol-based vulcanizing agent was used, because the fluorine-based rubber composition E containing the peroxide crosslinking agent was used in Comparative Example 4.

The heat-resistant hose for a vehicle of the present invention, which can be used in all kinds of hoses required to have heat resistance, is useful as an air system hose for an automobile, e.g., an air system hose for exhausting an air mixture containing gasoline vapor or the mist of an engine oil from an engine and supplying the mixture to the engine for re-combustion, or as a fuel system hose. Specifically, the heat-resistant hose for a vehicle of the present invention can be suitably used as a heat-resistant hose for an automobile, such as a fuel hose, an air hose, a turbo air hose (air hose for a supercharger), a vacuum brake hose, a common rail diesel fuel hose, or a diesel particulate filter (DPF) sensor hose. It should be noted that use of the heat-resistant hose for a vehicle of the present invention is not limited to automobiles, but it can be also used as a heat-resistant hose for a construction machine, ship, aircraft, etc.

Although specific embodiments of the instant invention have been described above and illustrated in the accompanying drawings in order to be more clearly understood, the above description is made by way of example and not as a limitation of the scope of the instant invention. It is contemplated that various modifications apparent to one of ordinary skill in the art could be made without departing from the scope of the invention.

It should be noted that the above-mentioned examples, which have shown specific embodiments in the present invention, are merely examples and should not be construed as being limitative. In addition, all modifications belonging to the scope equivalent to the scope of claims fall within the scope of the present invention.

What is claimed is:
1. A heat-resistant hose for a vehicle, comprising:
an inner layer; and
an outer layer directly formed on an outer peripheral surface of the inner layer,
wherein the inner layer comprises a fluorine-based rubber composition containing the following components (a) to (e):
(a) a fluorine-based rubber;
(b) a polyol-based vulcanizing agent;
(c) an organic onium compound;
(d) magnesium oxide; and
(e) calcium hydroxide, and wherein the outer layer comprises an acrylic rubber composition containing the following components (A) to (C):
(A) an acrylic rubber;
(B) a benzenediol; and
(C) at least one of an imidazole compound and a diamine-based vulcanizing agent.

2. A heat-resistant hose for a vehicle according to claim 1, wherein a content of the component (B) is 0.5 to 5 parts by weight with respect to 100 parts by weight of the component (A).

3. A heat-resistant hose for a vehicle according to claim 1, wherein the component (c) comprises at least one of a quaternary ammonium salt and a quaternary phosphonium salt.

4. A heat-resistant hose for a vehicle according to claim 1, wherein the component (C) comprises at least one of 1,2-dimethylimidazole and 2,2-bis[4-(4-aminophenoxy)phenyl]propane.

5. A heat-resistant hose for a vehicle according to claim 1, wherein a content of the component (b) is 0.5 to 5 parts by weight with respect to 100 parts by weight of the component (a), a content of the component (c) is 0.2 to 4 parts by weight with respect to 100 parts by weight of the component (a), a content of the component (d) is 0.5 to 15 parts by weight with respect to 100 parts by weight of the component (a), a content of the component (e) is 1 to 15 parts by weight with respect to 100 parts by weight of the component (a), and a content of the component (C) is 0.2 to 5 parts by weight with respect to 100 parts by weight of the component (A).

6. A heat-resistant hose for a vehicle according to claim 1, wherein the acrylic rubber composition of the outer layer further contains the following component (D) in addition to the components (A) to (C):
(D) a vulcanization accelerator,
wherein the component (D) comprises at least one of a thiourea-based vulcanization accelerator and a guanidine-based vulcanization accelerator.

7. A heat-resistant hose for a vehicle according to claim 1, wherein the inner layer and the outer layer are subjected to direct vulcanization adhesion to each other.

8. A heat-resistant hose for a vehicle according to claim 1, wherein the fluorine-based rubber composition is free of a benzenediol.

9. A heat-resistant hose for a vehicle according to claim 1, wherein an outermost layer formed by using the acrylic rubber composition containing the components (A) to (C) is directly formed on an outer peripheral surface of the outer layer.

10. A heat-resistant hose for a vehicle according to claim 1, wherein the component (B) comprises at least one selected from the group consisting of: 1,3-benzenediol (resorcinol); 1,2-benzenediol (catechol); and 1,4-benzenediol (hydroquinone).

11. A heat-resistant hose for a vehicle according to claim 10, wherein a content of the component (B) is 0.5 to 5 parts by weight with respect to 100 parts by weight of the component (A).

12. A heat-resistant hose for a vehicle according to claim 10, wherein the component (c) comprises at least one of a quaternary ammonium salt and a quaternary phosphonium salt.

13. A heat-resistant hose for a vehicle according to claim 10, wherein the component (C) comprises at least one of 1,2-dimethylimidazole and 2,2-bis[4-(4-aminophenoxy)phenyl]propane.

14. A heat-resistant hose for a vehicle according to claim 10, wherein a content of the component (b) is 0.5 to 5 parts by weight with respect to 100 parts by weight of the component (a), a content of the component (c) is 0.2 to 4 parts by weight with respect to 100 parts by weight of the component (a), a content of the component (d) is 0.5 to 15 parts by weight with respect to 100 parts by weight of the component (a), a content of the component (e) is 1 to 15 parts by weight with respect to 100 parts by weight of the component (a), and a content of the component (C) is 0.2 to 5 parts by weight with respect to 100 parts by weight of the component (A).

15. A heat-resistant hose for a vehicle according to claim 10, wherein the acrylic rubber composition of the outer layer further contains the following component (D) in addition to the components (A) to (C):
(D) a vulcanization accelerator,
wherein the component (D) comprises at least one of a thiourea-based vulcanization accelerator and a guanidine-based vulcanization accelerator.

16. A heat-resistant hose for a vehicle according to claim 10, wherein the inner layer and the outer layer are subjected to direct vulcanization adhesion to each other.

17. A heat-resistant hose for a vehicle according to claim 10, wherein the fluorine-based rubber composition is free of a benzenediol.

18. A heat-resistant hose for a vehicle according to claim 10, wherein an outermost layer formed by using the acrylic rubber composition containing the components (A) to (C) is directly formed on an outer peripheral surface of the outer layer.

* * * * *